April 30, 1968  H. G. SCHOLER ET AL  3,381,221

TEST SOCKET FOR TRANSISTORS AND THE LIKE

Filed Aug. 2, 1965

INVENTOR.
HENRY G. SCHOLER
BY DONALD B. NORDSTROM

James M Nickels

ATTORNEY 3,381,221
TEST SOCKET FOR TRANSISTORS
AND THE LIKE
Henry Gardner Scholer, Carteret, and Donald B. Nordstrom, Leonardo, N.J., assignors to The Bendix Corporation, Eatontown, N.J., a corporation of Delaware
Filed Aug. 2, 1965, Ser. No. 476,277
6 Claims. (Cl. 324—158)

ABSTRACT OF THE DISCLOSURE

A test socket assembly for semiconductors or the like which includes a base of insulating material with a contact plate mounted thereon and also contact members which contact the pins of a semiconductor device held on said contact plate.

---

The present invention relates to semiconductor devices and more particularly to means for testing such devices.

It is necessary that semiconductor devices be tested to determine by numerous electrical and electronic measurements the parameters thereof. In the past such tests have been made utilizing test sockets that produced physical deformation to some of the terminals of the device. Further variations in contact pressure produced unreliable results. This resulted in lack of reproducible measurements. Another difficulty is that exposed areas will permit an operator to inadvertently touch contacts permitting current to pass through the operator. Also the sockets were wired in thus making replacement difficult. Loading and unloading of the socket was difficult and it was possible to insert the device mis-oriented. Maintenance of the socket was high due to the extreme wear of the contacting surfaces.

The present invention provides a test socket that has an extremely reliable method with uniform contact pressure. The design is such that it will accept semiconductor devices that are oriented properly yet are easy to load and unload. Plug-in type features are provided for ease in replacing or repairing and all contacts are positioned to provide complete isolation of not only the conductors, but also the operator using the socket.

It is an object of the invention to provide means to permit the repeated testing of the same semiconductor device without any variations resulting from the test socket.

Another object of the invention is to provide an improved test socket.

Another object of the invention is to provide means for rapid installation and removal of test equipment.

Another object of the invention is to provide a method of testing semiconductor devices that is inexpensive and easy.

Another object of the invention is to provide means for testing semiconductor devices that will accept such devices only in an oriented attitude thereby removing the possibility of destroying unoriented semiconductors.

Another object is to provide an improved test socket that is easy and inexpensive to manufacture.

The above and other objects and features of the invention will appear more fully hereinafter from a consideration of the following description taken in connection with the accompanying drawing wherein two examples are illustrated by way of example.

Figure 2:
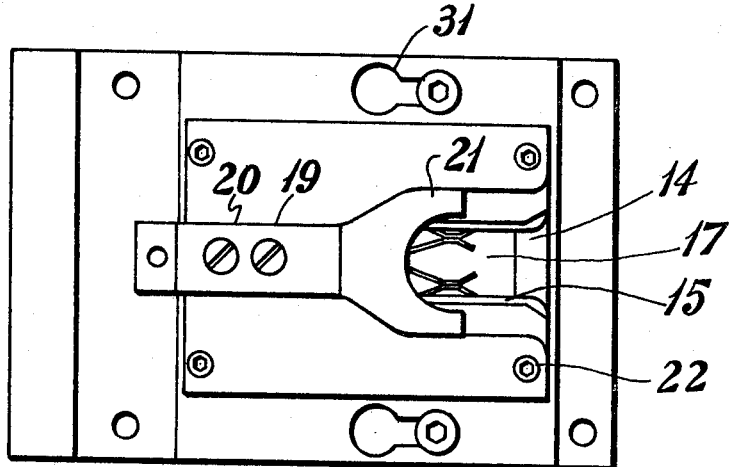
FIGURE 2 is a top view of the socket of FIGURE 1.

Referring now to the drawing wherein the same reference numeral has been assigned to similar parts in the various figures, a test socket assembly is indicated generally by the numeral 5. The test socket assembly 5 has a base 6 which has upright members 7 and 8 secured thereto by screws or other suitable means. The base 6 may be of aluminum or any other suitable material while the uprights 7 of an insulating material, for example, Lucite. The uprights 7 and 8 form the support for a transistor socket assembly 9. The assembly 9 includes an insulating member 10, a contact plate 11, a nesting plate 12 and a guide 13. The insulating member 10 has a cutout 14 which is in alignment with a cutout 15 in the contact plate 11. The contact plate 11 is of a material having good conductivity and has a contact tab 16 extending from the end opposite the cutout 15.

The nesting plate 12 which is of an insulating material, for example, Lucite, has a cutout 17 shaped to fit a semiconductor device platform, for example, a transistor 18. Also the nesting plate 12 has an elongated slot 19 in which a shank section 20 of the guide 13 is positioned. In addition to the shank section 20, the guide 13 has a U-shaped section 21 adapted to fit around the dome of a semiconductor device, for example, the transistor 18.

The insulating member 10, contact plate 11 and nesting plate 12 are secured to the uprights 7 and 8 by screws 22 or other suitable means. The guide 13 is spring loaded by means of bolts 23 and springs 24.

A member 25 is secured between the uprights 7 and 8 and serves as a support for test clip holder or terminal block 26. The member 25 and test clip holder 26 are of a suitable insulating material, for example, Lucite. A pair of test clips 27 are mounted on the holder 26. The clips 27 are positioned to contact the emitter and base pins of the transistor 18. Mounted in the upright 8 are three banana type plug assemblies 28. It is understood that other type plug assemblies could be used. Conductors 29 connect the test clips to two of the plug assemblies 28 and a conductor 30 connects the contact plate 11 to the other plug assembly 28. The base 6 has keyhole type mounting holes 31 to permit ready mounting on a supporting plate 32 by screws 33. Mounted on the supporting plate 32 is a terminal block 34 positioned to mate with the plugs 28. The terminal block 34 may be connected to suitable test equipment (not illustrated).

Figure 1:
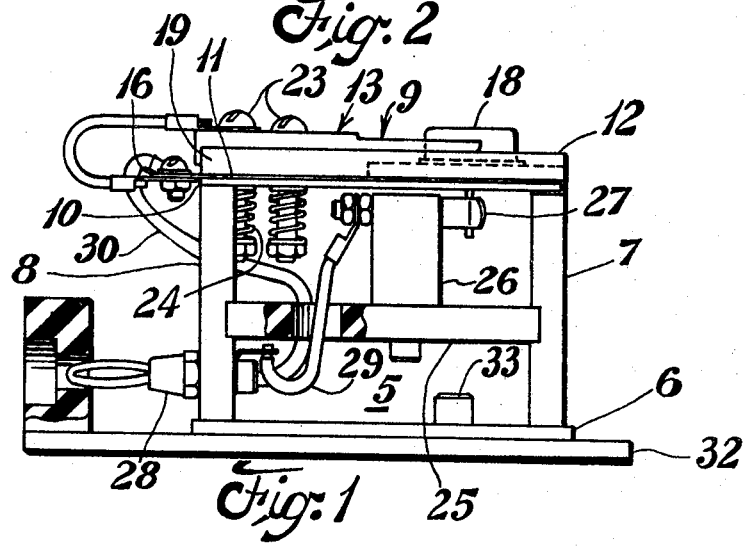
FIGURE 1 is a side view of a socket embodying the invention.
Figure 3:
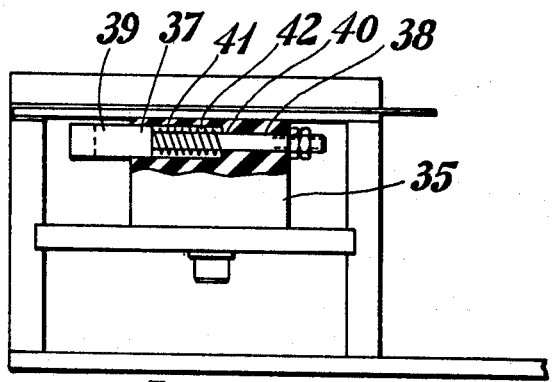
FIGURE 3 is a side view of another embodiment of the invention.

Reference is now made to FIGURE 3 wherein only the difference from that of FIGURE 1 will be described in detail. A block 35 of an insulating material, for example, Lucite, is mounted on the member 25 and has a recessed section 36. A contact assembly 37 is mounted in an opening 38 extending from the recessed section 36. The contact assembly includes a contact member 39, which for illustration may be V-shaped, mounted on a shank section 40. A spring 41 is positioned on the shank section 40 between the contact member 39 and a shoulder 42 formed by the recessed section 36. The shank section 40 has a threaded portion 43 and is held in the block 35 by nuts 44.

In operation a transistor 18 is positioned by the nesting plate 12 with the contact pins of the transistor mating with the test clips 27 or contact members 39. The nesting plate 12 is shaped so that only a properly oriented transistor will make contact. The spring loaded guide 13 holds the transistor 18 into intimate contact with the contact plate 11. Thus contact is made with the collector by the contact plate and the emitter and base pins are contacted by the test clips or spring loaded contacts. Either embodiment illustrated provides an extremely reliable method of contacting each terminal area with uniform contact pressure. It is understood that other arrangements of the contact assemblies could be made, such for example, as the test diodes or other semiconductor devices having different configurations.

Although only two embodiments have been illustrated and described in detail, various changes in the form and relative arrangement of the parts, which will now appear to those skilled in the art, may be made without departing from the scope of the invention.

What is claimed is:

1. A test socket for transistors and the like comprising a base, an insulating member mounted on said base, said insulating member having a U-shaped cutout in one end thereof, a contact plate of conductive material mounted on said insulating member, said contact plate having a U-shaped cutout in register with said cutout in said insulating member, a nesting plate of an insulating material mounted on said contact plate, said nesting plate having a cutout shaped to fit a transistor platform, said last cutout being in register with said other cutouts, a spring loaded yoke member positioned on said nesting plate for applying pressure on said transistor platform, conducting contact members supported on said base and positioned in register with said cutout, conducting contact plug assemblies mounted on said base opposite said cutouts and circuit means connecting said contact plate and said contacts to said contact plug assemblies.

2. The combination as set forth in claim 1 in which said base has keyhole type mounting holes.

3. A test socket assembly for a semiconductor device enclosed in a housing and having emitter and base contact pins extending therefrom, comprising a supporting structure of insulating material, a contact plate mounted on said supporting structure, said contact plate having a cutout in one end thereof, an insulating member having a cutout shaped to fit a housing base mounted on said contact plate, said last named cutout overlapping said contact plate cutout, means including a spring loaded yoke member positioned to apply pressure on a said housing base, conducting contact members positioned in said supporting structure to engage the respective emitter and base pins, plug type conducting contacts secured on said supporting structure opposite from said cutouts, and circuit means connecting said contact plate and contact members to the respective plug type contacts.

4. The combination as set forth in claim 3 in which said contact members are of a clip type.

5. The combination as set forth in claim 3 in which said contact members are of a spring pressure type.

6. The combination as set forth in claim 3 in which said supporting structure is of Plexiglas.

References Cited

UNITED STATES PATENTS

| | | | |
|---|---|---|---|
| 3,094,212 | 6/1963 | Moore | 324—158 XR |
| 3,286,181 | 11/1966 | Dudash | 324—158 |
| 3,319,166 | 5/1967 | Coleman | 324—158 |

RUDOLPH V. ROLINEC, *Primary Examiner.*

E. L. STOLARUN, *Assistant Examiner.*